(12) United States Patent
Hayasaka et al.

(10) Patent No.: US 12,528,935 B2
(45) Date of Patent: Jan. 20, 2026

(54) LATEX COMPOSITION FOR DIP MOLDING AND DIP-MOLDED ARTICLE

(71) Applicant: ZEON CORPORATION, Tokyo (JP)

(72) Inventors: Kentaro Hayasaka, Tokyo (JP); Tomoya Taniyama, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 544 days.

(21) Appl. No.: 17/923,064

(22) PCT Filed: May 20, 2021

(86) PCT No.: PCT/JP2021/019238
§ 371 (c)(1),
(2) Date: Nov. 3, 2022

(87) PCT Pub. No.: WO2021/241407
PCT Pub. Date: Dec. 2, 2021

(65) Prior Publication Data
US 2023/0151193 A1 May 18, 2023

(30) Foreign Application Priority Data
May 27, 2020 (JP) ................................. 2020-092414

(51) Int. Cl.
*C08L 9/04* (2006.01)
*C08L 75/04* (2006.01)

(52) U.S. Cl.
CPC ................. *C08L 9/04* (2013.01); *C08L 75/04* (2013.01)

(58) Field of Classification Search
CPC .................................. C08L 9/04; C08L 75/04
See application file for complete search history.

(56) References Cited

U.S. PATENT DOCUMENTS

2017/0283599 A1   10/2017   Cha et al.

FOREIGN PATENT DOCUMENTS

| CN | 106661307 A | 5/2017 |
| JP | 2003-306580 A | 10/2003 |
| WO | 2015/074106 A1 | 5/2015 |
| WO | 2018/174068 A1 | 9/2018 |
| WO | 2019/163482 A1 | 8/2019 |

OTHER PUBLICATIONS

Machine English translation of WO 2019/163482 Nagamori et al., Aug. 29, 2019.*
Nov. 17, 2022 International Preliminary Report on Patentability issued in International Application No. PCT/JP2021/019238.
Jul. 20, 2021 Search Report issued in International Patent Application No. PCT/JP2021/019238.
Jun. 6, 2024 Extended Search Report issued in European Patent Application No. 21813872.5.
Jul. 30, 2025 Office Action issued in European Patent Application No. 21813872.5.

* cited by examiner

*Primary Examiner* — Patrick D Niland
(74) *Attorney, Agent, or Firm* — Oliff PLC

(57) ABSTRACT

A latex composition for dip molding including a latex of a conjugated diene polymer (A) having a methyl ethyl ketone insolubles content of 50% by weight or less, and a latex of a polymer (B) having a methyl ethyl ketone insolubles content of 55% by weight or more.

9 Claims, 1 Drawing Sheet

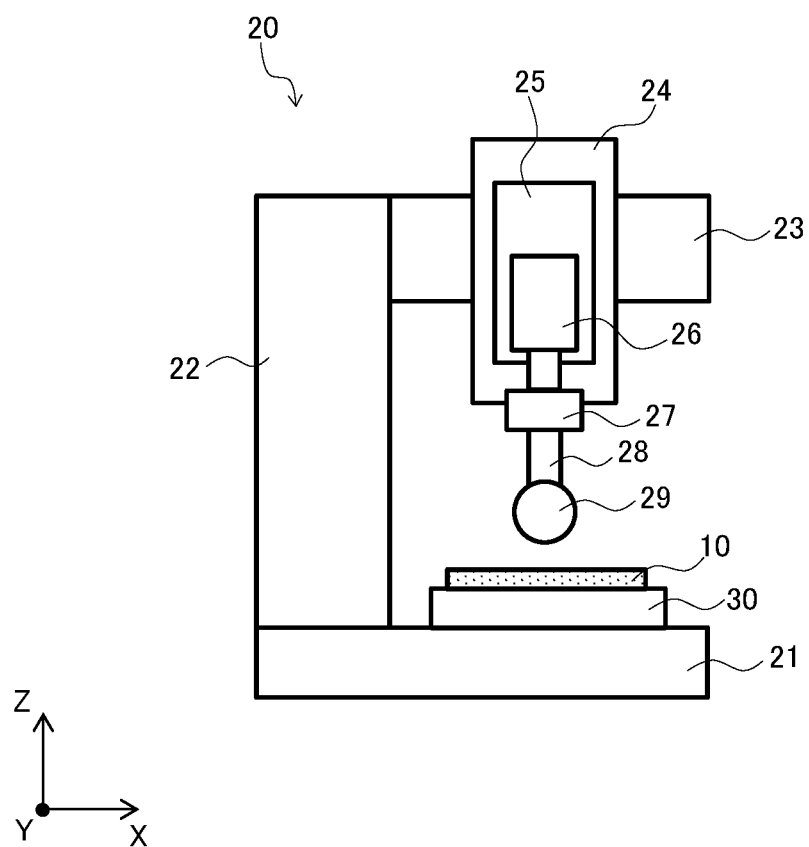

LATEX COMPOSITION FOR DIP MOLDING AND DIP-MOLDED ARTICLE

TECHNICAL FIELD

The present invention relates to a latex composition for dip molding, and more specifically a latex composition for dip molding which can provide a dip-molded article having excellent oil grip properties, flexibility, and chemical permeation resistance.

BACKGROUND ART

Traditionally, protective gloves having improved properties, such as grip properties and wear resistance, imparted by coatings of rubber, resin, or the like on fiber gloves are used in a variety of applications including manufacturing work in factories, light work, construction work, and faint work.

From the viewpoint of work efficiency, such protective gloves are required to have excellent flexibility as well as sufficient chemical permeation resistance and wet grip properties in the presence of oil residues (i.e., oil grip properties).

For example, Patent Document 1 discloses a glove having a fabric liner; a first polymeric composition adhered to at least a portion of the fabric liner, forming a polymeric coating; and a plurality of raised features comprising a second polymeric composition disposed on the polymeric coating, wherein the polymeric coating and the plurality of raised features comprise different polymeric compositions.

RELATED ART DOCUMENTS

Patent Documents

Patent Document 1: WO 2015/074106

SUMMARY OF THE INVENTION

Problem to be Solved by the Invention

According to the technique of Patent Document 1, although a glove having excellent oil grip properties can be obtained, its flexibility is not sufficient. Additionally, Patent Document 1 does not discuss chemical permeation resistance. From the viewpoint of preventing permeation of chemicals during handling of the chemicals, further enhanced chemical permeation resistance has also been desired. Another problem of the technique of Patent Document 1 is complications of the process because of the necessity of forming two coatings.

The present invention has been made in view of the current issues, and an objective of the present invention is to provide a latex composition for dip molding which can provide a dip-molded article having excellent oil grip properties, flexibility, and chemical permeation resistance.

Means for Solving Problems

As a result of dedicated research to solve the problem, the present inventors have found that a dip-molded article formed by dip molding a latex composition comprising a latex of a conjugated diene polymer (A) having a methyl ethyl ketone insolubles content of 50% by weight or less and a latex of a polymer (B) having a methyl ethyl ketone insolubles content of 55% by weight or more has excellent oil grip properties, flexibility, and chemical permeation resistance. This finding has led to the completion of the present invention.

Specifically, the present invention provides a latex composition for dip molding comprising a latex of a conjugated diene polymer (A) having a methyl ethyl ketone insolubles content of 50% by weight or less and a latex of a polymer (B) having a methyl ethyl ketone insolubles content of 55% by weight or more.

In the latex composition for dip molding according to the present invention, the conjugated diene polymer (A) preferably has a Young's modulus of 0.8 MPa or less, and the polymer (B) preferably has a Young's modulus of 1 MPa or more.

In the latex composition for dip molding according to the present invention, the conjugated diene polymer (A) preferably has a degree of swelling in methyl ethyl ketone of 55 times or more, and the polymer (B) preferably has a degree of swelling in methyl ethyl ketone of 45 times or less.

In the latex composition for dip molding according to the present invention, the conjugated diene polymer (A) is preferably a nitrile group-containing conjugated diene polymer having a methyl ethyl ketone insolubles content of 50% by weight or less.

Preferably, in the latex composition for dip molding according to the present invention, the conjugated diene polymer (A) is present in an amount of 40 parts by weight or more in 100 parts by weight of polymer components.

In the latex composition for dip molding according to the present invention, the polymer (B) is preferably a nitrile group-containing conjugated diene polymer having a methyl ethyl ketone insolubles content of 55% by weight or more or a polyurethane resin having a methyl ethyl ketone insolubles content of 55% by weight or more.

Preferably, the latex composition for dip molding according to the present invention further comprises a sulfur-based cross-linking agent.

The present invention also provides a dip-molded article formed using the latex composition for dip molding.

The present invention further provides a dip-molded article formed by soaking a substrate with the latex composition for dip molding.

Effects of Invention

The present invention can provide a latex composition for dip molding which can provide a dip-molded article having excellent oil grip properties, flexibility, and chemical permeation resistance, and also can provide a dip-molded article having excellent oil grip properties, flexibility, and chemical permeation resistance.

BRIEF DESCRIPTION OF DRAWINGS

FIG. 1 is a view illustrating an indentation tester 20 used to measure flexibility in Examples.

DESCRIPTION OF EMBODIMENTS

<Latex Composition for Dip Molding>

A latex composition for dip molding comprises a latex of a conjugated diene polymer (A) having a methyl ethyl ketone insolubles content of 50% by weight or less and a latex of a polymer (B) having a methyl ethyl ketone insolubles content of 55% by weight or more.

What is required for the latex composition for dip molding according to the present invention is that it contains particles of the conjugated diene polymer (A) having a methyl ethyl ketone insolubles content of 50% by weight or less and particles of the polymer (B) having a methyl ethyl ketone insolubles content of 55% by weight or more, each of the particles being dispersed in an aqueous medium such as water (that is, in the form of a latex). Although not particularly limited, the latex composition for dip molding is preferably a mixture of a latex of the conjugated diene polymer (A) having a methyl ethyl ketone insolubles content of 50% by weight or less and a latex of the polymer (B) having a methyl ethyl ketone insolubles content of 55% by weight or more, and is more suitably a composition prepared by mixing these in the form of latexes.

The conjugated diene polymer (A) having a methyl ethyl ketone insolubles content of 50% by weight or less (hereinafter, conveniently referred to as "conjugated diene polymer (A)") in the latex of a conjugated diene polymer (A) having a methyl ethyl ketone insolubles content of 50% by weight or less (hereinafter, conveniently referred to as "latex of the conjugated diene polymer (A)") may be any polymer containing units derived from a conjugated diene monomer. Examples thereof include, but are not limited to, nitrile rubber (NBR), natural rubber (NR), styrene-butadiene rubber (SBR), synthetic polyisoprene rubber (IR), polybutadiene rubber (BR), styrene-isoprene copolymer rubber, styrene-isoprene-styrene copolymer rubber, and the like. Among these, preferred is synthetic rubber because the effects of the present invention become more remarkable. More preferred are conjugated diene polymers containing a nitrile group (hereinafter, conveniently, referred to as "nitrile group-containing conjugated diene polymers") such as NBR.

Examples of usable nitrile group-containing conjugated diene polymers include, but are not limited to, copolymers obtained by copolymerizing an $\alpha,\beta$-ethylenically unsaturated nitrile monomer and a conjugated diene monomer optionally with an additional copolymerizable ethylenically unsaturated acid monomer.

Examples of usable $\alpha,\beta$-ethylenically unsaturated nitrile monomers include, but are not limited to, ethylenically unsaturated compounds having a nitrile group and preferably having 3 to 18 carbon atoms. Examples such $\alpha,\beta$-ethylenically unsaturated nitrile monomers include acrylonitrile, methacrylonitrile, halogen-substituted acrylonitriles, and the like. Among these, acrylonitrile is particularly preferred. These $\alpha,\beta$-ethylenically unsaturated nitrile monomers may be used alone or in combinations of two or more.

In such a nitrile group-containing conjugated diene polymer, the content of $\alpha,\beta$-ethylenically unsaturated nitrile monomer units is preferably 10 to 45% by weight, more preferably 20 to 40% by weight, still more preferably 25 to 40% by weight of the total monomer units. When the content of $\alpha,\beta$-ethylenically unsaturated nitrile monomer units is controlled within the ranges described above, a dip-molded article having further enhanced solvent resistance can be obtained.

The conjugated diene monomer is preferably a conjugated diene monomer having 4 to 6 carbon atoms such as 1,3-butadiene, isoprene, 2,3-dimethyl-1,3-butadiene, 1,3-pentadiene, or chloroprene, more preferably 1,3-butadiene or isoprene, particularly preferably 1,3-butadiene. These conjugated diene monomers may be used alone or in combinations of two or more.

The content of conjugated diene monomer units in the nitrile group-containing conjugated diene polymer is preferably 40 to 80% by weight, more preferably 52 to 78% by weight, still more preferably 55 to 75% by weight of the total monomer units. When the content of conjugated diene monomer units is controlled within the range described above, a dip-molded article having further enhanced flexibility can be obtained.

Further, the nitrile group-containing conjugated diene polymer may be a copolymer prepared by copolymerizing a monomer for forming an $\alpha,\beta$-ethylenically unsaturated nitrile monomer unit and a monomer for forming a conjugated diene monomer unit with an additional copolymerizable ethylenically unsaturated acid monomer.

Examples of such additional copolymerizable ethylenically unsaturated acid monomers include, but are not limited to, carboxyl group-containing ethylenically unsaturated monomers, sulfonic acid group-containing ethylenically unsaturated monomers, phosphoric acid group-containing ethylenically unsaturated monomers, and the like.

Examples of carboxyl group-containing ethylenically unsaturated monomers include, but are not limited to, ethylenically unsaturated monocarboxylic acids such as acrylic acid, methacrylic acid, and crotonic acid; ethylenically unsaturated polyvalent carboxylic acids and anhydrides thereof, such as fumaric acid, maleic acid, itaconic acid, maleic anhydride, and itaconic anhydride; partially esterified products of ethylenically unsaturated polyvalent carboxylic acids, such as methyl maleate and methyl itaconate; and the like.

Examples of sulfonic acid group-containing ethylenically unsaturated monomers include, but are not limited to, vinylsulfonic acid, methylvinylsulfonic acid, styrenesulfonic acid, (meth)allylsulfonic acid, ethyl (meth)acrylate-2-sulfonate, 2-acrylamide-2-hydroxypropanesulfonic acid, and the like.

Examples of phosphoric acid group-containing ethylenically unsaturated monomers include, but are not limited to, propyl (meth)acrylate-3-chloro-2-phosphate, ethyl (meth)acrylate-2-phosphate, 3-allyloxy-2-hydroxypropane phosphoric acid, and the like.

These additional copolymerizable ethylenically unsaturated acid monomers can be used in the form of alkali metal salts or ammonium salts, and may be used alone or in combinations of two or more. Among the additional copolymerizable ethylenically unsaturated acid monomers listed above, preferred are carboxyl group-containing ethylenically unsaturated monomers, more preferred are ethylenically unsaturated monocarboxylic acids, still more preferred are acrylic acid and methacrylic acid, and particularly preferred is methacrylic acid.

When the nitrile group-containing conjugated diene polymer contains units of the additional copolymerizable ethylenically unsaturated acid monomer, the content of units of the additional copolymerizable ethylenically unsaturated acid monomer is preferably 0.1 to 15% by weight, more preferably 1 to 10% by weight, still more preferably 2 to 8% by weight of the total monomer units.

A latex of the nitrile group-containing conjugated diene polymer can be prepared by emulsion polymerization of a monomer mixture containing the above-mentioned monomers, for example. In the emulsion polymerization, polymerization additives typically used, such as an emulsifier, a polymerization initiator, and a molecular weight modifier, can be used.

Examples of emulsifiers usable in the emulsion polymerization include, but are not limited to, anionic surfactants, nonionic surfactants, cationic surfactants, amphoteric surfactants, and the like. Preferred are anionic surfactants. Specific examples of anionic surfactants include fatty acid salts such as sodium laurate, potassium myristate, sodium palmitate, potassium oleate, sodium linolenate, and sodium rosinate; alkylbenzene sulfonates such as sodium dodecylbenzenesulfonate, potassium dodecylbenzenesulfonate, sodium decylbenzenesulfonate, potassium decylbenzenesulfonate, sodium cetylbenzenesulfonate, and potassium cetylbenzenesulfonate; alkylsulfosuccinic acid salts such as sodium di(2-ethylhexyl)sulfosuccinate, potassium di(2-ethylhexyl)sulfosuccinate, and sodium dioctylsulfosuccinate; alkylsulfuric acid ester salts such as sodium lauryl sulfate and potassium lauryl sulfate; polyoxyethylene alkyl ether sulfuric acid ester salts such as sodium polyoxyethylene lauryl ether sulfate and potassium polyoxyethylene lauryl ether sulfate; monoalkyl phosphoric acid salts such as sodium lauryl phosphate and potassium lauryl phosphate; and the like.

The amount of the emulsifier used in the emulsion polymerization is preferably 0.5 to 10 parts by weight, more preferably 1 to 8 parts by weight relative to 100 parts by weight of the total monomers used.

Although not particularly limited, preferred polymerization initiators are radical initiators. Examples of radical initiators include, but are not limited to, inorganic peroxides such as sodium persulfate, potassium persulfate, ammonium persulfate, potassium perphosphate, and hydrogen peroxide; organic peroxides such as t-butyl peroxide, cumene hydroperoxide, p-menthane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, and t-butylperoxy isobutyrate; azo compounds such as azobisisobutyronitrile, azobis-2,4-dimethylvaleronitrile, azobiscyclohexanecarbonitrile, and methyl azobisisobutyrate; and the like. Among these, preferred are inorganic peroxides and organic peroxides, more preferred are inorganic peroxides, and particularly preferred are persulfate salts. These polymerization initiators may be used alone or in combinations of two or more.

The amount of the polymerization initiator used is preferably 0.01 to 2 parts by weight, more preferably 0.05 to 1.5 parts by weight relative to 100 parts by weight of the total monomers used.

Examples of molecular weight modifiers include, but are not limited to, α-methylstyrene dimers; mercaptans such as t-dodecylmercaptan, n-dodecylmercaptan, and octylmercaptan; halogenated hydrocarbons such as carbon tetrachloride, methylene chloride, and methylene bromide; sulfur-containing compounds such as tetraethylthiuram disulfide, dipentamethylenethiuram disulfide, and diisopropylxanthogen disulfide; and the like. Among these, preferred are mercaptans, and more preferred is t-dodecylmercaptan. These molecular weight modifiers may be used alone or in combinations of two or more.

Although the amount of the molecular weight modifier used depends on its type, it is preferably 0.1 to 1.5 parts by weight, more preferably 0.2 to 1.0 part by weight relative to 100 parts by weight of the total monomers used.

The emulsion polymerization is typically carried out in water. The amount of water used is preferably 80 to 500 parts by weight, more preferably 100 to 200 parts by weight relative to 100 parts by weight of the total monomers used.

In the emulsion polymerization, polymerization additives other than those listed above may be further used as needed. Examples of such polymerization additives include chelating agents, dispersants, pH adjusters, deoxidizers, particle size adjusters, and the like. The types and amounts to be used of those polymerization additives are not particularly limited.

The monomers can be added in any of the following manners, for example: placing the monomers in the reaction vessel at a time; continuously or intermittently adding the monomers with the progress of polymerization; adding and reacting a portion of the monomers to a specific conversion ratio and then continuously or intermittently adding the remaining monomers; and the like. When the monomers are mixed and continuously or intermittently added, the composition of the mixture may be fixed or varied.

Further, the monomers used may be mixed and then placed in the reaction vessel, or each monomer may be individually placed in the reaction vessel.

Although not particularly limited, the polymerization temperature during emulsion polymerization is typically 0 to 95° C., preferably 5 to 70° C. Although not particularly limited, the polymerization time is typically about 5 to 40 hours.

After the polymerization reaction is terminated, as needed, unreacted monomers may be removed, and the solids content and the pH may be adjusted.

The conjugated diene polymer (A) in the latex of the conjugated diene polymer (A) used in the present invention has a methyl ethyl ketone insolubles content of 50% by weight or less, preferably 0.01 to 40% by weight, more preferably 0.1 to 30% by weight, still more preferably 1 to 5% by weight, particularly preferably 1.2 to 3.5% by weight. The methyl ethyl ketone insolubles content is a measure of the gel content in the conjugated diene polymer (A) in the latex of the conjugated diene polymer (A). Too high a methyl ethyl ketone insolubles content results in a dip-molded article having reduced oil grip properties and flexibility.

The conjugated diene polymer (A) in the latex of the conjugated diene polymer (A) used in the present invention has a degree of swelling in methyl ethyl ketone of preferably 55 times or more, more preferably 60 to 200 times, still more preferably 70 to 150 times, particularly preferably 90 to 140 times. The degree of swelling in methyl ethyl ketone is a measure of the swellability of the conjugated diene polymer (A) in the latex of the conjugated diene polymer (A). When the degree of swelling in methyl ethyl ketone is controlled within the above ranges, a dip-molded article having further enhanced oil grip properties and flexibility can be obtained.

In the present invention, the methyl ethyl ketone insolubles content and the degree of swelling in methyl ethyl ketone of the conjugated diene polymer (A) in the latex of the conjugated diene polymer (A) can be measured, for example, by the following method: First, the latex of the conjugated diene polymer (A) is applied to a substrate by casting or the like, and dried into a dry film, which is then weighed (the weight is referred to as weight "W1"). Next, the obtained dry film is immersed in methyl ethyl ketone at 25° C. for 24 hours. After the film after immersion is weighed (the weight is referred to as "W2"), the film is dried at 105° C. for 3 hours to remove methyl ethyl ketone. Then, the film after removal of methyl ethyl ketone is weighed (the weight is referred to as "W3"). From these measured weights, the methyl ethyl ketone insolubles content and the degree of swelling in methyl ethyl ketone can be determined based on the formulas (1) and (2).

Methyl ethyl ketone insolubles content (unit: % by weight)=$(W3/W1) \times 100$    (1)

Degree of swelling in methyl ethyl ketone (unit: times)=$W2/W3$    (2)

Examples of methods for controlling the methyl ethyl ketone insolubles content and the degree of swelling in methyl ethyl ketone of the conjugated diene polymer (A) in the latex of the conjugated diene polymer (A) within the above ranges include, but are not limited to, methods such as selecting the type and the amount of a chain transfer agent used in the process of producing the latex of the conjugated diene polymer (A), or selecting the polymerization temperature. For example, the use of a larger amount of chain transfer agent tends to result in a lower methyl ethyl ketone insolubles content and a higher degree of swelling in methyl ethyl ketone, and a lower polymerization temperature tends to result in a lower methyl ethyl ketone insolubles content and a higher degree of swelling in methyl ethyl ketone.

Although not particularly limited, the conjugated diene polymer (A) in the latex of the conjugated diene polymer (A) used in the present invention has a Young's modulus of preferably 0.8 MPa or less, more preferably 0.01 to 0.8 MPa, still more preferably 0.1 to 0.8 MPa, particularly preferably 0.1 to 0.3 MPa. The Young's modulus is a measure of the hardness of the conjugated diene polymer (A) in the latex of the conjugated diene polymer (A). When the Young's modulus is controlled within the above ranges, a dip-molded article having further enhanced oil grip properties and flexibility can be obtained.

In the present invention, the Young's modulus of the conjugated diene polymer (A) in the latex of the conjugated diene polymer (A) can be measured, for example, by the following method: First, the latex of the conjugated diene polymer (A) is applied to a substrate by casting or the like, and dried into a dry film. From the obtained dry film, a dumbbell-shaped specimen is prepared using a dumbbell (Die-C, available from Dumbbell Co., Ltd.) in accordance with ASTM D-412. The obtained dumbbell-shaped specimen is stretched at a stretching rate of 500 mm/min, and from the stress ($\sigma$) and the strain ($\varepsilon$) at 10% elongation, the Young's modulus (E) can be determined based on the formula $E=\sigma/\varepsilon$.

Examples of methods for controlling the Young's modulus of the conjugated diene polymer (A) in the latex of the conjugated diene polymer (A) within the above ranges include, but are not limited to, methods such as selecting the type and the amount of a chain transfer agent used in the process of producing the latex of the conjugated diene polymer (A), or selecting the polymerization temperature. For example, the use of a larger amount of chain transfer agent tends to result in a lower Young's modulus, and a lower polymerization temperature tends to result in a lower Young's modulus.

The weight average particle size of particles of the conjugated diene polymer (A) in the latex of the conjugated diene polymer (A) is preferably 30 to 1000 nm, more preferably 50 to 500 nm, still more preferably 70 to 200 nm. When the conjugated diene polymer (A) is particles having a weight average particle size within the above ranges, a dip-molded article can be formed in which the polymer (B) having a methyl ethyl ketone insolubles content of 55% by weight or more (described later) is more finely dispersed in the conjugated diene polymer (A). This contributes to further enhanced flexibility of the resulting dip-molded article. The weight average particle size of the conjugated diene polymer (A) can be measured, for example, by laser diffraction scattering.

Although not particularly limited, the glass transition temperature of the conjugated diene polymer (A) in the latex of the conjugated diene polymer (A) is preferably 10° C. or less, more preferably −45 to −10° C., still more preferably −40 to −10° C., still further more preferably −33 to −20° C.

The polymer (B) (hereinafter, conveniently referred to as polymer (B)) in the latex of a polymer (B) having a methyl ethyl ketone insolubles content of 55% by weight or more (hereinafter, conveniently referred to as latex of the polymer (B)) is not particularly limited, and may be any polymer having a methyl ethyl ketone insolubles content of 55% by weight or more. Examples thereof include nitrile group-containing conjugated diene polymers, acrylic resins, PTFE resins, acrylonitrile-styrene (AS) resins, polyurethane resins, vinyl chloride resins, and the like. From the viewpoint of forming a dip-molded article having further enhanced oil grip properties, flexibility, and chemical permeation resistance, nitrile group-containing conjugated diene polymers, polyurethane resins, and vinyl chloride resins are preferred, and nitrile group-containing conjugated diene polymers and polyurethane resins are more preferred.

Examples of nitrile group-containing conjugated diene polymers for the polymer (B) include those obtained in the same manner as for the conjugated diene polymer (A) described above (note that the polymerization conditions and the like should be selected to give a methyl ethyl ketone insolubles content of 55% by weight or more), and the like. From the viewpoint of controlling the methyl ethyl ketone insolubles content to 55% by weight or more, those obtained by further cross-linking polymers prepared in the same manner as for the conjugated diene polymer (A) (for example, polymers having a methyl ethyl ketone insolubles content of less than 55% by weight (particularly 50% by weight or less)) can be suitably used.

In the case where the polymer (B) is a polyurethane resin, it may be any polyurethane resin without limitation as long as it has a urethane bond formed as a result of the reaction between a polyol and a polyisocyanate and has a methyl ethyl insolubles content of 55% by weight or more.

In the case where the polymer (B) is a vinyl chloride resin, it may be any of vinyl chloride homopolymers and copolymers of vinyl chloride and monomers copolymerizable with vinyl chloride. In the case where the vinyl chloride resin is a copolymer, the content of vinyl chloride monomer units in the vinyl chloride resin is preferably 50% by weight or more, more preferably 75% by weight or more, still more preferably 90% by weight or more.

Examples of monomers copolymerizable with vinyl chloride include $\alpha$-olefin monomers such as ethylene, propylene, 1-butene, 4-methyl-1-pentene, 1-hexene, and 1-octene; aromatic monomers such as styrene, $\alpha$-methylstyrene, and vinylpyridine; $\alpha,\beta$-ethylenically unsaturated monocarboxylic acids such as acrylic acid, methacrylic acid, crotonic acid, and cinnamic acid; esters of $\alpha,\beta$-ethylenically unsaturated monocarboxylic acids such as ethyl (meth)acrylate, butyl (meth)acrylate, and 2-ethylhexyl (meth)acrylate; $\alpha,\beta$-ethylenically unsaturated polyvalent carboxylic acids such as maleic acid, fumaric acid, and itaconic acid; $\alpha,\beta$-ethylenically unsaturated polyvalent carboxylic acid monoesters such as monomethyl maleate, monoethyl maleate, and monoethyl itaconate; $\alpha,\beta$-ethylenically unsaturated polyvalent carboxylic acid polyvalent esters such as dimethyl maleate, di-n-butyl fumarate, dimethyl itaconate, and di-2-ethylhexyl itaconate; vinyl ester monomers such as vinyl acetate and vinyl propionate; $\alpha,\beta$-ethylenically unsaturated monocarboxylic acid amides such as acrylamide and methacrylamide; N-substituted maleimides; vinyl ether monomers such as vinyl methyl ether, vinyl ethyl ether, and vinyl cetyl ether; vinylidene compounds such as vinylidene chloride; and the like. Among these, preferred are vinyl ester monomers and esters of $\alpha,\beta$-ethylenically unsaturated monocarboxylic acids, and more preferred are vinyl acetate and (meth)acrylic acid esters. In other words, preferred vinyl chloride resins for the polymer (B) are copolymers of vinyl chloride and vinyl acetate, and copolymers of vinyl chloride and a (meth)acrylic acid ester.

The vinyl chloride resin as the polymer (B) may be produced by any production method without limitation as long as the above monomer(s) is/are polymerized. Examples thereof include known emulsion polymerization, seeded emulsion polymerization, and fine suspension polymerization methods by radical polymerization, and the like.

The vinyl chloride resin as the polymer (B) preferably has a K-value measured in accordance with JIS K 7367-2 of 50 to 95, more preferably 60 to 80.

The polymer (B) in the latex of the polymer (B) used in the present invention preferably has a methyl ethyl ketone insolubles content of 55% by weight or more, preferably 60 to 99% by weight, more preferably 70 to 97% by weight, still more preferably 78 to 94% by weight. The methyl ethyl ketone insolubles content is a measure of the gel content in the polymer (B) in the latex of the polymer (B). Too high a methyl ethyl ketone insolubles content results in a dip-molded article having reduced flexibility.

The polymer (B) in the latex of the polymer (B) used in the present invention has a degree of swelling in methyl ethyl ketone of preferably 45 times or less, more preferably 20 to 0.1 times, still more preferably 15 to 1 time. The degree of swelling in methyl ethyl ketone is a measure of the swellability of the polymer (B) in the latex of the polymer (B). When the degree of swelling in methyl ethyl ketone is controlled within the above ranges, a dip-molded article having further enhanced oil grip properties can be obtained.

In the present invention, the methyl ethyl ketone insolubles content and the degree of swelling in methyl ethyl ketone of the polymer (B) in the latex of the polymer (B) can be measured, for example, by the same method as for the latex of the conjugated diene polymer (A) described above.

Any method may be used without limitation to control the methyl ethyl ketone insolubles content and the degree of swelling in methyl ethyl ketone of the polymer (B) in the latex of the polymer (B) within the above ranges. In the case where the polymer (B) is a nitrile group-containing conjugated diene polymer, examples of such methods include methods such as subjecting a nitrile group-containing conjugated diene polymer latex prepared by emulsion polymerization or the like to a cross-linking reaction or the like. For example, the cross-linking reaction introduces cross-linking structure to the nitrile group-containing conjugated diene polymer in the nitrile group-containing conjugated diene polymer latex, which results in an increased methyl ethyl ketone insolubles content and a reduced degree of swelling in methyl ethyl ketone. In the case where the polymer (B) is a polyurethane resin, examples thereof include methods such as using a latex containing polyurethane resin beads obtained using a trifunctional or more polyol and/or a trifunctional or more polyisocyanate as the polyurethane resin. In the case where the polymer (B) is a vinyl chloride resin, examples thereof include methods such as using a resin in the form of a latex or a dispersion of powder.

Although not particularly limited, the polymer (B) in the latex of the polymer (B) used in the present invention has a Young's modulus of preferably 1 MPa or more, more preferably 1 to 10,000 MPa, still more preferably 1 to 1,000 MPa, particularly preferably 1 to 20 MPa. The Young's modulus is a measure of the hardness of the polymer (B) in the latex of the polymer (B). When the Young's modulus is controlled within the above ranges, a dip-molded article having further enhanced oil grip properties can be obtained.

In the present invention, the Young's modulus of the polymer (B) in the latex of the polymer (B) can be measured, for example, by the same method as for the latex of the conjugated diene polymer (A) described above.

Any method may be used without limitation to control the Young's modulus of the polymer (B) in the latex of the polymer (B) within the above ranges. For example, in the case where the polymer (B) is a nitrile group-containing conjugated diene polymer, examples of such methods include methods such as subjecting a nitrile group-containing conjugated diene polymer latex prepared by emulsion polymerization or the like to a cross-linking reaction or the like. In the case where the polymer (B) is a polyurethane resin, examples thereof include methods such as using a latex containing polyurethane resin beads obtained using a trifunctional or more polyol and/or a trifunctional or more polyisocyanate as the polyurethane resin.

The present invention provides a latex composition for dip molding comprising a latex of a conjugated diene polymer (A) having a methyl ethyl ketone insolubles content of 50% by weight or less and a latex of a polymer (B) having a methyl ethyl ketone insolubles content of 55% by weight or more. According to the present invention, owing to the presence of the latex of a conjugated diene polymer (A) and the latex of a polymer (B), dip-molding using the latex composition can result in a dip-molded article having excellent oil grip properties, flexibility, and chemical permeation resistance.

What is required for the latex composition for dip molding according to the present invention is that it contains particles of the conjugated diene polymer (A) having a methyl ethyl ketone insolubles content of 50% by weight or less and particles of the polymer (B) having a methyl ethyl ketone insolubles content of 55% by weight or more, each of the particles being dispersed in an aqueous medium such as water (that is, in the form of a latex), and the latex composition may be a composition prepared by a method with which a composition in such a state can be prepared. In the present invention, the composition is preferably a mixture of a latex of the conjugated diene polymer (A) and a latex of the polymer (B). In particular, according to the present invention, in a state in which a latex of the conjugated diene polymer (A) and a latex of the polymer (B) are present, in other words, particles of the conjugated diene polymer (A) and particles of the polymer (B) are dispersed in water, the particles of the conjugated diene polymer (A) and the particles of the polymer (B) can be homogeneously and finely dispersed in the latex composition. Accordingly, dip-molding thereof results in a dip-molded article where the polymers are coprecipitated while the polymer (B) is finely dispersed in a matrix of the conjugated diene polymer (A). Thus, due to the effects of the conjugated diene polymer (A) and the polymer (B) finely dispersed in the conjugated diene polymer (A), excellent oil grip properties, flexibility, and chemical permeation resistance can be imparted to the resulting dip-molded article. In the present invention, the latex composition is preferably a mixture of a latex of the conjugated diene polymer (A) and a latex of the polymer (B), which is preferably prepared by mixing them in the form of latexes. In this case, the effects can be further enhanced, and a dip-molded article having further enhanced oil grip properties, flexibility, and chemical permeation resistance can be obtained. Needless to say, what is required for the latex composition for dip molding according to the present invention is that particles of the conjugated diene polymer (A) and particles of the polymer (B) are dispersed in an aqueous dispersion, and the latex composition is not limited to those obtained by mixing latexes of these.

The weight average particle size of particles of the polymer (B) in the latex of the polymer (B) is preferably 0.05 to 500 µm, more preferably 0.1 to 500 µm, still more preferably 0.1 to 60 µm, still further more preferably 0.1 to 50 µm, particularly preferably 0.1 µm or more and less than 3 µm. When the polymer (B) is particles having a weight average particle size within the above ranges, a dip-molded article can be formed in which the polymer (B) is more finely dispersed in the conjugated diene polymer (A). This contributes to further enhanced flexibility of the resulting dip-molded article. The weight average particle size of the polymer (B) can be measured, for example, by laser diffraction scattering.

Although not particularly limited, the glass transition temperature of the polymer (B) in the latex of the polymer (B) is preferably −80 to 150° C., more preferably −60 to 120° C., still more preferably −40 to 100° C.

The content of the conjugated diene polymer (A) and the content of the polymer (B) in the latex composition for dip molding according to the present invention are not particularly limited. The content of the conjugated diene polymer (A) relative to 100 parts by weight of the polymer components contained in the latex composition for dip molding (100 parts by weight of the total amount of the conjugated diene polymer (A) and the polymer (B) if the polymer components include only the conjugated diene polymer (A) and the polymer (B)) is preferably 40 parts by weight or more, more preferably 40 to 95 parts by weight, still more preferably 40 to 80 parts by weight, particularly preferably 60 to 75 parts by weight. The content of the polymer (B) relative to 100 parts by weight of the polymer components contained in the latex composition for dip molding is preferably 5 to 60 parts by weight, more preferably 10 to 60 parts by weight, still more preferably 20 to 60 parts by weight, still further more preferably 25 to 40 parts by weight. Furthermore, the conjugated diene polymer (A) and the polymer (B) are contained in the latex composition for dip molding according to the present invention in a weight ratio "conjugated diene polymer (A):polymer (B)" of preferably 99:1 to 10:90, more preferably 95:5 to 20:80, still more preferably 90:10 to 30:70, still further more preferably 80:20 to 40:60, particularly preferably 75:25 to 45:55, most preferably 75:25 to 60:40. When the contents of the conjugated diene polymer (A) and the polymer (B) are controlled within the ranges above, a dip-molded article having further enhanced oil grip properties, flexibility, and chemical permeation resistance can be obtained.

Preferably, the latex composition for dip molding according to the present invention further contains a sulfur-based cross-linking agent in addition to the latex of the conjugated diene polymer (A) and the latex of the polymer (B).

Examples of sulfur-based cross-linking agents include, but are not limited to, sulfur such as powdered sulfur, sublimed sulfur, precipitated sulfur, colloidal sulfur, surface-treated sulfur, and insoluble sulfur; sulfur-containing compounds such as sulfur chloride, sulfur dichloride, morpholine disulfide, alkylphenol disulfides, dibenzothiazyl disulfide, caprolactam disulfide, phosphorus-containing polysulfide, and polysulfide polymers; sulfur donating compounds such as tetramethyl thiuram disulfide, selenium dimethyldithiocarbamate, and 2-(4'-moipholinodithio)benzothiazole; and the like. These sulfur-based cross-linking agents may be used alone or in combinations of two or more.

The content of the sulfur-based cross-linking agent is preferably 0.01 to 5 parts by weight, more preferably 0.05 to 3 parts by weight, still more preferably 0.1 to 2 parts by weight relative to 100 parts by weight of the polymer components contained in the latex composition for dip molding.

Preferably, the latex composition for dip molding according to the present invention further comprises a cross-linking accelerator (vulcanization accelerator) and zinc oxide in addition to the sulfur-based cross-linking agent.

Examples of cross-linking accelerators (vulcanization accelerators) include, but are not limited to, dithiocarbamic acids, such as diethyldithiocarbamic acid, dibutyldithiocarbamic acid, di-2-ethylhexyldithiocarbamic acid, dicyclohexyldithiocarbamic acid, diphenyldithiocarbamic acid, and dibenzyldithiocarbamic acid, and zinc salts thereof; 2-mercaptobenzothiazole, zinc 2-mercaptobenzothiazole, 2-mercaptothiazoline, dibenzothiazyl disulfide, 2-(2,4-dinitrophenylthio)benzothiazole, 2-(N,N-diethylthio-carbamoylthio) benzothiazole, 2-(2,6-dimethyl-4-morpholinothio) benzothiazole, 2-(4'-morpholino-dithio)benzothiazole, 4-morpholinyl-2-benzothiazyl disulfide, 1,3-bis(2-benzothiazyl-mercaptomethyl) urea, and the like. Among these, preferred are zinc diethyldithiocarbamate, zinc dibutyldithiocarbamate, 2-mercaptobenzothiazole, and zinc 2-mercaptobenzothiazole. These cross-linking accelerators may be used alone or in combinations of two or more.

The content of the cross-linking accelerator is preferably 0.1 to 10 parts by weight, more preferably 0.5 to 5 parts by weight relative to 100 parts by weight of the polymer components contained in the latex composition for dip molding. The content of zinc oxide is preferably 0.1 to 10 parts by weight, more preferably 0.5 to 5 parts by weight relative to 100 parts by weight of the polymer components contained in the latex composition for dip molding.

Moreover, the latex composition for dip molding according to the present invention may further contain a water-soluble polymer.

Examples of water-soluble polymers include vinyl compounds such as polyvinyl alcohol and polyvinylpyrrolidone; cellulose derivatives, such as hydroxyethyl cellulose, hydroxypropyl cellulose, and carboxymethyl cellulose, and salts thereof; polycarboxylic compounds, such as polyacrylic acid, and sodium salts thereof; polyoxyethylene derivatives such as polyethylene glycol ether; and the like. Preferred water-soluble polymers are cellulose derivatives and salts thereof, and more preferred are carboxymethyl cellulose and sodium salts thereof.

The water-soluble polymer can be any polymer soluble in water. Although not particularly limited, its solubility in water is preferably 1 g or more, more preferably 7 g or more, particularly preferably 10 g or more in 100 g of water at 25° C. Although not particularly limited, the upper limit of the solubility of the water-soluble polymer in water is typically 1,000,000 g or less.

Although not particularly limited, the weight average molecular weight (Mw) of the water-soluble polymer is preferably 100 or more, more preferably 1,000 or more, and is preferably 5,000,000 or less, more preferably 3,000,000 or less.

The content of the water-soluble polymer is preferably 0.01 to 10 parts by weight, more preferably 0.1 to 5 parts by weight relative to 100 parts by weight of the polymer components contained in the latex composition for dip molding according to the present invention.

The solids content of the latex composition for dip molding according to the present invention is preferably 20 to 65% by weight, more preferably 30 to 60% by weight, still more preferably 35 to 55% by weight. By controlling the solids content of the latex composition for dip molding within the ranges above, the resulting latex composition for dip molding can have improved transport efficiency, and can have appropriate viscosity, which results in improved handling properties of the latex composition for dip molding.

The latex composition for dip molding according to the present invention has a pH of preferably 5 to 13, more preferably 7 to 10, still more preferably 7.5 to 9. Control of the pH of the latex composition for dip molding within the ranges above can improve the mechanical stability to suppress formation of coarse aggregates during transportation of the latex composition for dip molding, and can give appropriate viscosity to the latex composition for dip molding, which results in improved handling properties of the latex composition for dip molding.

The latex composition for dip molding according to the present invention has a viscosity at 25° C. of preferably 2,000 to 100,000 mPa·s, more preferably 2,500 to 50,000 mPa·s, still more preferably 3,000 to 20,000 mPa·s. The viscosity at 25° C. of the latex composition for dip molding can be measured, for example, by using a B-type viscometer at 25° C. at a rotational speed of 6 rpm. The viscosity at 25° C. of the latex composition for dip molding can be adjusted, for example, by a method such as adjusting the concentrations of the polymer components in the latex composition for dip molding, or adding a compound having a thickening action to the latex composition for dip molding.

The latex composition for dip molding according to the present invention may also contain a filler such as carbon black, silica, calcium carbonate, aluminum silicate, magnesium silicate, calcium silicate, magnesium oxide, zinc (meth)acrylate, magnesium (meth)acrylate, or titanium oxide. Moreover, the latex composition for dip molding according to the present invention may optionally contain predetermined amounts of various additives other than the water-soluble salt and the filler, such as an anti-aging agent, an antioxidant, a preservative agent, an antimicrobial agent, a wetting agent, a dispersant, a pigment, a dye, a reinforcing agent, and a pH adjuster.

For example, the latex composition for dip molding according to the present invention can be prepared by mixing the components described above. The components can be mixed in any order without limitation. To further enhance the dispersibility of the components, it is preferred to preliminarily mix the latex of the conjugated diene polymer (A) with the latex of the polymer (B), and then add and mix optional components. The latex of the conjugated diene polymer (A) can be mixed with the latex of the polymer (B) in any manner without limitation. To further enhance the dispersibility, it is preferred to mix the latex of the conjugated diene polymer (A) and the latex of the polymer (B) in the form of latexes (latex blending).

<Dip-Molded Article>

The dip-molded article according to the present invention is a molded article prepared from the latex composition for dip molding according to the present invention described above, and is typically formed by dip molding the latex composition for dip molding according to the present invention described above.

Because the dip-molded article according to the present invention is a molded article formed using the latex composition for dip molding according to the present invention described above, the dip-molded article according to the present invention includes at least a polymer layer comprising the conjugated diene polymer (A) having a methyl ethyl ketone insolubles content of 50% by weight or less and the polymer (B) having a methyl ethyl ketone insolubles content of 55% by weight or more. Suitable ranges of the ratio of the content of the conjugated diene polymer (A) to that of the polymer (B) in the dip-molded article according to the present invention are the same as the above-mentioned suitable ranges of the ratio of the content of the conjugated diene polymer (A) to that of the polymer (B) in the latex composition for dip molding according to the present invention.

The dip-molded article according to the present invention may be a membrane molded article comprising a latex composition for dip molding and prepared by immersing a mold for dip molding in the latex composition for dip molding, such as the latex composition according to the present invention described above, or may be a laminate of a substrate and a polymer layer comprising the latex composition for dip molding, the laminate being prepared by immersing the substrate in the latex composition for dip molding. A case where the dip-molded article according to the present invention is a laminate of a substrate and a polymer layer comprising the latex composition for dip molding will be illustrated below, but the present invention should not be construed as limited to such an embodiment.

Although any substrate can be used without limitation, a fibrous substrate can be suitably used when the dip-molded article according to the present invention is used as a protective glove. Any fibrous substrate can be used without limitation. For example, a glove-shaped product produced by weaving a twisted yarn of single fibers as fibers can be used. The fibrous substrate has an average thickness of preferably 50 to 3,000 μm, more preferably 100 to 2,000 μm.

For example, the dip-molded article according to the present invention can be prepared by immersing a substrate in the latex composition for dip molding to form a polymer layer comprising the latex composition for dip molding on the substrate. At this time, preferably, the substrate is immersed in the latex composition for dip molding in the state where the substrate is preliminarily put on a mold for molding having a desired shape.

Any mold for molding on which the substrate is put can be used without limitation, and molds made of a variety of materials, such as porcelain molds, glass molds, metal molds, and plastic molds can be used. As for the shape of the mold for molding, a desired shape should be selected according to the shape of the final product. For example, when the dip-molded article according to the present invention is used as a protective glove, molds for molding a variety of gloves, such as those having a shape including a wrist to finger tips, are preferably used as the mold for molding on which the substrate is put.

Prior to immersion of the substrate in the latex composition for dip molding, preferably, the substrate is immersed in a coagulant solution to deposit the coagulant solution on the substrate. At this time, preferably, the substrate is preliminarily put on a mold for molding having a desired shape and the substrate put on the mold is immersed in the coagulant solution. Examples of the mold for molding having a desired shape include those described above. After the coagulant solution is deposited on the substrate, the solvent contained in the coagulant solution is preferably removed by drying. Although the drying temperature at this time is not particularly limited and may be selected depending on the solvent to be used, the drying temperature is preferably 10 to 80° C., more preferably 15 to 70° C. Although not particularly limited, the drying time is preferably 600 to 1 second, more preferably 300 to 5 seconds.

In the next step, the substrate on which the coagulant solution is deposited is immersed in the latex composition for dip molding while the substrate is put on the mold for molding having a desired shape. Thereby, the latex composition for dip molding is coagulated on the substrate to deposit a polymer layer comprising the latex composition for dip molding on the substrate.

Preferably, after the immersion of the substrate in the latex composition for dip molding, the workpiece is dried. Although not particularly limited, the drying temperature at this time is preferably 10 to 80° C., more preferably 15 to 80° C. Although not particularly limited, the drying time is preferably 120 minutes to 5 seconds, more preferably 60 minutes to 10 seconds.

When a latex composition for dip molding containing a sulfur-based cross-linking agent is used as the latex composition for dip molding, the latex composition for dip molding may be preliminarily aged (also referred to as prevulcanized) before use.

Although not particularly limited, the temperature condition during the aging is preferably 20 to 50° C. The time for aging is preferably 4 hours or more and 120 hours or less, more preferably 24 hours or more and 72 hours or less to prevent peel-off between the substrate and the polymer layer comprising the latex composition for dip molding and to provide a dip-molded article having improved wear resistance when used as a protective glove.

Preferably, in the next step, the polymer components contained in the latex composition for dip molding are cross-linked by heating the latex composition for dip molding deposited on the substrate.

The heating temperature for cross-linking is preferably 60 to 160° C., more preferably 80 to 150° C. Control of the heating temperature within the ranges above can reduce the time needed for the cross-linking reaction to improve the productivity of the dip-molded article, and can suppress oxidative degradation of the polymer components caused by excessive heating to improve the physical properties of the dip-molded article. The heating time for the cross-linking may be appropriately selected according to the heating temperature, and is typically 5 to 120 minutes.

Preferably, water-soluble impurities (such as the emulsifier, the water-soluble polymer, and the coagulant) are removed from the polymer layer in the dip-molded article thus prepared, by immersing the polymer layer formed on the substrate in warm water at 20 to 80° C. for about 0.5 to 60 minutes as needed. Although such a treatment to immerse the polymer layer in warm water may be performed after cross-linking of the polymer components in the polymer layer, it is preferred that the treatment be performed before cross-linking of the polymer components in the polymer layer because water-soluble impurities can be more efficiently removed.

After the immersion in warm water, the polymer layer may be further dried. Although the drying temperature and the drying time at this time are not particularly limited, the drying temperature and the drying time can be the same as those in the drying step after the immersion in the latex composition for dip molding described above.

After the polymer layer is formed on the substrate put on the mold for molding, the product can be removed (or detached) from the mold for molding to provide a dip-molded article. Examples of usable removal methods include methods such as peeling the product from the mold for molding by hands, or peeling the product by hydraulic pressure or pressure of compressed air.

Before or after removing the dip-molded article the mold for molding, a heat treatment (post cross-linking step) may be further performed at a temperature of 60 to 120° C. for 10 to 120 minutes. After removing the dip-molded article from the mold for molding, a surface-treated layer may be formed on the inner surface and/or the outer surface of the dip-molded article by a surface treatment such as chlorination or coating.

In the dip-molded article according to the present invention thus prepared, the polymer layer comprising the above-mentioned latex composition for dip molding according to the present invention is foiled on the substrate by coagulation using the coagulant, and the polymer layer preferably has a relatively large thickness of preferably 0.05 to 1.0 mm, more preferably 0.06 to 0.8 mm, still more preferably 0.07 to 0.7 mm, particularly preferably more than 0.3 mm and 0.7 mm or less. This structure can enhance the wear resistance of the resulting dip-molded article.

The dip-molded article according to the present invention has excellent oil grip properties, flexibility, and chemical permeation resistance derived from the use of the latex composition for dip molding according to the present invention described above, and therefore can be suitably used for gloves, particularly protective gloves, for example. In the above description, a case where the dip-molded article according to the present invention is a laminate comprising the substrate and the polymer layer comprising the latex composition for dip molding has been illustrated. As described above, the present invention is not limited by such an embodiment, and the dip-molded article according to the present invention can be a membrane molded article comprising the latex composition for dip molding, the membrane molded article being prepared by immersing a mold for dip molding in the latex composition for dip molding.

EXAMPLES

Hereinafter, the present invention will be described based on more specific examples, but the present invention should not be construed as limited to these examples. Hereinafter, the tam "parts" is weight-based unless otherwise specified. The following tests and evaluations were performed.

<Glass Transition Temperature of Polymer Particles in Latex>

Each latex was measured for the glass transition temperature of polymer particles in the latex using a differential scanning calorimeter ("EXSTAR DSC6220" available from SIT NanoTechnology Inc.) in accordance with JIS K7121.

<Weight Average Particle Size of Polymer Particles in Latex>

Each latex was measured for the weight average particle size of polymer particles in the latex by laser diffraction scattering using a particle size analyzer ("LS 13 320" available from Beckman Coulter Inc.).

<Methyl Ethyl Ketone Insolubles Content and Degree of Swelling in Methyl Ethyl Ketone of Polymer Particles in Latex>

Each latex was applied to a substrate by casting, and was dried at 25° C. for 120 hours to form a dry film. The resulting dry film was weighed (the weight is referred to as "W1"). Next, after the dry film was immersed in methyl ethyl ketone at 25° C. for 24 hours, the film after immersion was weighed (the weight is referred to as "W2"). The film was then dried at 105° C. for 3 hours to remove methyl ethyl ketone. The film after removal of methyl ethyl ketone was weighed (the weight is referred to as "W3"), and the methyl ethyl ketone insolubles content and the swelling degree in methyl ethyl ketone were determined using these measured weights based on the following formulas (1) and (2):

$$\text{Methyl ethyl ketone insolubles content (unit: \% by weight)} = (W3/W1) \times 100 \quad (1)$$

$$\text{Swelling degree in methyl ethyl ketone (unit: times)} = W2/W3 \quad (2)$$

<Young's Modulus of Polymer Particles in Latex>

Each latex was applied to a substrate by casting, and was dried at 25° C. for 120 hours to form a dry film. From the resulting dry film, a dumbbell-shaped specimen was prepared using a dumbbell (Die-C, available from Dumbbell Co., Ltd.) in accordance with ASTM D-412. The obtained dumbbell-shaped specimen was stretched at a stretching rate of 500 mm/min. From the stress (σ) and the strain (ε) at 10% elongation, the Young's modulus (E) was determined based on the formula E=σ/ε. Note that since a casted film could not be successfully foiled using latexes having a high methyl ethyl insolubles content, the latexes were combined with the latex of a nitrile group-containing conjugated diene polymer (A-1) prepared in Production Example 1 to prepare 30% by weight (on a solids basis) mixtures. Each of the resulting mixtures was used to form a dry film, and the dry film was likewise measured. The Young's modulus was determined by excluding the contribution of the nitrile group-containing conjugated diene polymer (A-1) from the measurement. More specifically, the Young's modulus was determined on the assumption that the contribution of the nitrile group-containing conjugated diene polymer (A-1) and the contribution of the measurement sample were 70% and 30%, respectively.

<Oil Grip Properties>

Conical metal molds having weights of 1.0 kg, 2.0 kg, 3.0 kg, 4.0 kg, and 5.0 kg were prepared, and a test oil IRM903 was applied to the metal molds. A worker put on protective gloves (dip-molded articles), and then lifted up these dry metal molds with residues of the test oil IRM903 in ascending order of weight to determine the maximum weight lifted. The measurements were performed with the same worker. A larger maximum weight lifted can be associated with higher oil grip properties.

<Flexibility>

A palm part of each protective glove (dip-molded article) was cut into a 60 mm×60 mm shape to obtain a measurement sample. Then, using an indentation tester 20 shown in FIG. 1 of WO 2018/174068 (including a measurement unit "HG1003-SL" (trade name) available from HORIUCHI ELECTRONICS CO., LTD.), the Young's modulus of the measurement sample was measured in accordance with the method disclosed in WO 2018/174068. Specific conditions were shown below. During the measurement, resin tapes were attached to the surface of the measurement sample opposite from the surface with the polymer layer formed thereon (measurement surface) at positions corresponding to suction holes of a suction table 30, and the measurement was carried out by pressing a spherical indenter from the rubber layer side while suction was being pertained by the suction table 30. In addition, the measurement was carried out at three points of the 60 mm×60 mm measurement sample, and the measurement results of the Young's modulus at the three points were averaged, and the average was used as the Young's modulus in each example. A Young's modulus of 580 kPa or less can be associated with sufficiently high flexibility.

Spherical indenter: a spherical indenter made of SUS and having a diameter of 10 mm
Indentation speed: 0.5 mm/s
Maximum load: 0.5 N
Initial position of spherical indenter: −6 mm (a position 6 mm above suction table 30)

<Chemical Permeation Resistance of Protective Glove (Dip-Molded Article)>

Each protective glove (dip-molded article) was measured for chemical permeation resistance with reference to the dish method specified in JIS Z 0208 as follows:

(1) A round piece having an appropriate size was cut out as a sample from the protective glove (dip-molded article).
(2) The weight (W4) of the sample with an aluminum dish was measured.
(3) 50 mL of n-hexane was placed in the aluminum dish.
(4) The sample (dip-molded article) was placed on the aluminum dish with n-hexane such that the rubber layer of the sample was in contact with the liquid.
(5) The sample was firmly attached to the aluminum dish using a fixing instrument.
(6) The weight (W5) of the whole aluminum dish was determined.
(7) The aluminum dish was left to stand inside a fume hood at room temperature in an upside down position in which the n-hexane was in contact with the sample.
(8) After 72 hour standing, the weight (W6) of the whole aluminum dish was determined.
(9) The proportion of n-hexane which permeated and evaporated through the sample (percent permeation of solvent gas) was determined based on the following formula:

$$\text{Percent permeation (\%) of solvent gas} = 100 - ((W6 - W4)/(W5 - W4) \times 100)$$

A smaller percent permeation of solvent gas can be associated with better chemical permeation resistance.

Production Example 1

(Preparation of Latex of Nitrile Group-Containing Conjugated Diene Polymer (A-1))

68 Parts of 1,3-butadiene as a conjugated diene monomer, 27 parts of acrylonitrile as an α,β-ethylenically unsaturated nitrile monomer, 5 parts of methacrylic acid as an ethylenically unsaturated monocarboxylic acid monomer, 0.5 parts of t-dodecylmercaptan, 132 parts of deionized water, 3 parts of sodium dodecylbenzenesulfonate, 0.5 parts of the sodium salt of a condensation product of β-naphthalene sulfonic acid and formalin, 0.3 parts of potassium persulfate, and 0.05 parts of sodium ethylenediaminetetraacetate were placed in a polymerization reactor, and were polymerized while the polymerization temperature was being kept at 30 to 40° C. The reaction was continued until the polymerization conversion ratio reached 94%. Thus, a copolymer latex was prepared.

Thereafter, unreacted monomers were removed from the resulting copolymer latex, and the pH and the solids content of the copolymer latex were adjusted to prepare a latex of a nitrile group-containing conjugated diene polymer (A-1) having a solids content of 40% by weight and a pH of 8.

Analysis of the monomeric composition of the nitrile group-containing conjugated diene polymer (A-1) in the latex of a conjugated diene polymer (A-1) confirmed that the monomeric composition approximately matches the ratio of the monomers used. The nitrile group-containing conjugated diene polymer (A-1) in the latex of a conjugated diene polymer (A-1) was measured for glass transition temperature (Tg), weight average particle size, methyl ethyl ketone insolubles content, degree of swelling in methyl ethyl ketone, and Young's modulus in accordance with the methods described above. The results are shown in Table 1.

Production Example 2

(Preparation of Latex of Nitrile Group-Containing Conjugated Diene Polymer (A-2))

68 Parts of 1,3-butadiene as a conjugated diene monomer, 27 parts of acrylonitrile as an α,β-ethylenically unsaturated nitrile monomer, 5 parts of methacrylic acid as an ethylenically unsaturated monocarboxylic acid monomer, 0.6 parts of t-dodecylmercaptan, 132 parts of deionized water, 3 parts of sodium dodecylbenzenesulfonate, 1 part of the sodium salt of a condensation product of β-naphthalene sulfonic acid and formalin, and 0.01 parts of sodium hydrosulfite were placed in a polymerization reactor, and the temperature in the polymerization reactor was kept at 5° C. Thereafter, a mixture of 6 parts of deionized water, 0.020 parts of sodium ethylenediaminetetraacetate, 0.002 parts of ferrous sulfate, and 0.02 parts of sodium formaldehyde sulfoxylate was placed in the polymerization reactor, and 0.04 parts of 1,1,3,3-tetrabutyl hydroperoxide was added thereto to allow polymerization to proceed while the temperature in the polymerization reactor was being kept at 5° C. The reaction was continued until the polymerization conversion ratio reached 94%. Thus, a copolymer latex was prepared.

Thereafter, unreacted monomers were removed from the resulting copolymer latex, and the pH and the solids content of the copolymer latex were adjusted to prepare a latex of a nitrile group-containing conjugated diene polymer (A-2) having a solids content of 40% by weight and a pH of 8.

Analysis of the monomeric composition of the nitrile group-containing conjugated diene polymer (A-2) in the latex of a conjugated diene polymer (A-2) confirmed that the monomeric composition approximately matches the ratio of the monomers used. The nitrile group-containing conjugated diene polymer (A-2) in the latex of a conjugated diene polymer (A-2) was measured for glass transition temperature (Tg), weight average particle size, methyl ethyl ketone insolubles content, degree of swelling in methyl ethyl ketone, and Young's modulus in accordance with the methods described above. The results are shown in Table 1.

Production Example 3

(Preparation of Latex of Nitrile Group-Containing Conjugated Diene Polymer (B-1))

To 100 parts of the nitrile group-containing conjugated diene polymer (A-1) in the latex of a nitrile group-containing conjugated diene polymer (A-1) prepared in Production Example 1 were added 5 parts of colloidal sulfur (available from Hosoi Chemical Industry Co., Ltd.) and 5 parts of zinc dibutyldithiocarbamate (available from Ouchi Shinko Chemical industrial Co., Ltd.). After mixing, the mixture was left to stand at 25° C. for 12 hours, followed by heating with stirring at 80° C. for 5 hours. Next, colloidal sulfur and zinc dibutyldithiocarbamate were removed by centrifugation, and the solids content was adjusted to 40% by weight. Thus, a latex of a nitrile group-containing conjugated diene polymer (B-1) was prepared.

Analysis of the monomeric composition of the nitrile group-containing conjugated diene polymer (B-1) in the resulting latex of a nitrile group-containing conjugated diene polymer (B-1) confirmed that the monomeric composition approximately matches that of the nitrile group-containing conjugated diene polymer (A-1). The nitrile group-containing conjugated diene polymer (B-1) in the latex of a nitrile group-containing conjugated diene polymer (B-1) was measured for glass transition temperature (Tg), weight average particle size, methyl ethyl ketone insolubles content, degree of swelling in methyl ethyl ketone, and Young's modulus in accordance with the methods described above. The results are shown in Table 1.

Production Example 4

(Preparation of Latex of Nitrile Group-Containing Conjugated Diene Polymer (B-2))

A latex of a nitrile group-containing conjugated diene polymer (B-2) was prepared in the same manner as in Production Example 3 except that the latex of a nitrile group-containing conjugated diene polymer (A-2) prepared in Production Example 2 was used in place of the latex of a nitrile group-containing conjugated diene polymer (A-1) prepared in Production Example 1.

Analysis of the monomeric composition of the nitrile group-containing conjugated diene polymer (B-2) in the latex of a nitrile group-containing conjugated diene polymer (B-2) confirmed that the monomeric composition approximately matches that of the nitrile group-containing conjugated diene polymer (A-2). The nitrile group-containing conjugated diene polymer (B-2) in the latex of a nitrile group-containing conjugated diene polymer (B-2) was measured for glass transition temperature (Tg), weight average particle size, methyl ethyl ketone insolubles content, degree of swelling in methyl ethyl ketone, and Young's modulus in accordance with the methods described above. The results are shown in Table 1.

Example 1

(Preparation of Aqueous Dispersion of Colloidal Sulfur)

1.0 Part of colloidal sulfur (available from Hosoi Chemical Industry Co., Ltd.), 0.5 parts of a dispersant (available from Kao Corporation, trade name "Demol N"), 0.0015 parts of a 5% by weight potassium hydroxide aqueous solution (available from Wako Pure Chemical Industries, Ltd.), and 1.0 part of water were stirred and ground in a ball mill for 48 hours to prepare an aqueous dispersion of colloidal sulfur having a solids content of 50% by weight.

(Preparation of Aqueous Dispersion of Zinc Dibutyldithiocarbamate, Aqueous Dispersion of Zinc Oxide, and Aqueous Dispersion of Titanium Oxide)

An aqueous dispersion of zinc dibutyldithiocarbamate, an aqueous dispersion of zinc oxide, and an aqueous dispersion of titanium oxide were prepared in the same manner as above except that in place of colloidal sulfur, zinc dibutyldithiocarbamate (available from Ouchi Shinko Chemical Industrial Co., Ltd.), zinc oxide (available from Seido Chemical Industry Co., Ltd.), and titanium oxide were used.

(Preparation of Latex Composition for Dip Molding)

The latex of a nitrile group-containing conjugated diene polymer (A-1) prepared in Production Example 1 and the latex of a nitrile group-containing conjugated diene polymer (B-1) prepared in Production Example 3 were mixed in a weight ratio "nitrile group-containing conjugated diene polymer (A-1):nitrile group-containing conjugated diene polymer (B-1)" of 70:30. The mixture was combined with 5% by weight potassium hydroxide to prepare a latex composition having a solids content of 45% by weight and a pH of 8.

The aqueous dispersions of the compounding agents prepared above were added in amounts such that the amounts on a solids basis of colloidal sulfur, zinc dibutyldithiocarbamate, zinc oxide, and titanium oxide were 1.0 part, 1.0 part, 1.5 parts, and 3.0 parts, respectively, relative to 100 parts of the polymer components in the above resulting latex composition. During the addition of each of the aqueous dispersions of the compounding agents, a predetermined amount thereof was slowly added while the latex composition was being stirred. After these compounding agents were homogenously mixed, 0.3 parts of carboxymethyl cellulose (available from Daicel Corporation, trade name "Daicel 2200", weight average molecular weight: 550,000, acid content: 3.7 mmol/g) as a water-soluble polymer was added, and the solids content of the latex was adjusted. Thus, a latex composition for dip molding having a solids content of 40% by weight and a viscosity at 25° C. of 3,000 mPa·s was prepared.

(Preparation of Coagulant Solution)

Calcium nitrate as a coagulant was dissolved in methanol in a proportion of 3.0% by weight to prepare a coagulant solution.

(Production of Protective Glove (Dip-Molded Article))

Initially, the latex composition for dip molding prepared above was aged (also referred to as prevulcanized) at a temperature of 30° C. for 48 hours. In the next step, a ceramic glove mold on which a glove-shaped fibrous substrate (material: nylon, linear density: 300 denier, gauge No.: 13 gauge, thickness: 0.8 mm) was put was immersed in the coagulant solution prepared above for 5 seconds, and was pulled out of the coagulant solution, followed by drying at a temperature of 30° C. for 1 minute. Subsequently, the resulting ceramic glove mold was immersed in the latex composition for dip molding for 5 seconds, and was pulled out of the latex composition for dip molding, followed by drying at a temperature of 30° C. for 30 minutes. In the next step, the resulting ceramic glove mold was heated at a temperature of 70° C. for 10 minutes to cause cross-linking. Thus, a polymer layer having a thickness of 0.6 mm was formed on the fibrous substrate. Subsequently, the ceramic glove mold on which the polymer layer was formed was immersed in warm water at 60° C. for 90 seconds to elute water-soluble impurities, followed by drying at 30° C. for 10 minutes. Further, a heat treatment at 125° C. was performed for 30 minutes to cross-link polymer molecules in the polymer layer. In the next step, the fibrous substrate on which the polymer layer was formed was removed from the ceramic glove mold to obtain a protective glove (dip-molded article).

The resulting protective glove (dip-molded article) was measured for oil grip properties, flexibility, and chemical permeation resistance in accordance with the methods described above. The results are shown in Table 1.

Example 2

A latex composition for dip molding having a solids content of 40% by weight and a viscosity at 25° C. of 3,000 mPa·s was prepared in the same manner as in Example 1 except that the latex of a nitril group-containing conjugated diene polymer (B-2) prepared in Production Example 4 was used in place of the latex of a nitrile group-containing conjugated diene polymer (B-1) prepared in Production Example 3. A protective glove (dip-molded article) having a 0.6 mm thick polymer layer was produced in the same manner as in Example 1 using the prepared latex composition for dip molding, and was likewise evaluated. The results are shown in Table 2.

Example 3

A latex composition for dip molding having a solids content of 40% by weight and a viscosity at 25° C. of 3,000 mPa·s was prepared in the same manner as in Example 1 except that a latex of urethane resin beads (B-3) (available from Negami Chemical Industrial Co., Ltd., C-200T) was used in place of the latex of a nitrile group-containing conjugated diene polymer (B-1) prepared in Production Example 3, and the amount of carboxymethyl cellulose used as a water-soluble polymer was changed to 0.5 parts. A protective glove (dip-molded article) having a 0.6 mm thick polymer layer was produced in the same manner as in Example 1 using the prepared latex composition for dip molding, and was likewise evaluated. The results are shown in Table 2.

The urethane beads (B-3) contained in the latex of urethane beads (B-3) were measured for glass transition temperature (Tg), weight average particle size, methyl ethyl ketone insolubles content, degree of swelling in methyl ethyl ketone, and Young's modulus in accordance with the methods described above, and the results are shown in Table 1.

Example 4

A latex composition for dip molding having a solids content of 40% by weight and a viscosity at 25° C. of 3,000 mPa·s was prepared in the same manner as in Example 1 except that a latex of urethane resin beads (B-4) (available from Negami Chemical Industrial Co., Ltd., C-800T) was used in place of the latex of a nitrile group-containing conjugated diene polymer (B-1) prepared in Production Example 3, and the amount of carboxymethyl cellulose used as a water-soluble polymer was changed to 0.5 parts. A protective glove (dip-molded article) having a 0.6 mm thick polymer layer was produced in the same manner as in Example 1 using the prepared latex composition for dip molding, and was likewise evaluated. The results are shown in Table 2.

The urethane beads (B-4) contained in the latex of urethane beads (B-4) were measured for glass transition temperature (Tg), weight average particle size, methyl ethyl ketone insolubles content, degree of swelling in methyl ethyl ketone, and Young's modulus in accordance with the methods described above, and the results are shown in Table 1.

Example 5

A latex composition for dip molding having a solids content of 40% by weight and a viscosity at 25° C. of 3,000 mPa·s was prepared in the same manner as in Example 1 except that the latex of a vinyl chloride resin (B-5) was used in place of the latex of a nitrile group-containing conjugated diene polymer (B-1) prepared in Production Example 3, and the amount of carboxymethyl cellulose used as a water-soluble polymer was changed to 1.0 part. A protective glove (dip-molded article) having a 0.6 mm thick polymer layer was produced in the same manner as in Example 1 using the prepared latex composition for dip molding, and was likewise evaluated. The results are shown in Table 2.

The vinyl chloride resin (B-5) contained in the latex of a vinyl chloride resin (B-5) were measured for glass transition temperature (Tg), weight average particle size, methyl ethyl ketone insolubles content, degree of swelling in methyl ethyl ketone, and Young's modulus in accordance with the methods described above, and the results are shown in Table 1.

Example 6

A latex composition for dip molding having a solids content of 40% by weight and a viscosity at 25° C. of 3,000 mPa·s was prepared in the same manner as in Example 1 except that the latex of a nitrile group-containing conjugated diene polymer (A-2) prepared in Production Example 2 was used in place of the latex of a nitrile group-containing conjugated diene polymer (A-1) prepared in Production Example 1. A protective glove (dip-molded article) having a 0.6 mm thick polymer layer was produced in the same manner as in Example 1 using the prepared latex composition for dip molding, and was likewise evaluated. The results are shown in Table 2.

Comparative Example 1

A latex composition for dip molding having a solids content of 40% by weight and a viscosity at 25° C. of 3,000 mPa·s was prepared in the same manner as in Example 1 except that the latex of a nitrile group-containing conjugated diene polymer (B-1) prepared in Production Example 3 was not used, and the amounts of substances added were determined on a solids basis relative to 100 parts of the polymer component in the latex of a nitrile group-containing conjugated diene polymer (A-1). A protective glove (dip-molded article) having a 0.6 mm thick polymer layer was produced in the same manner as in Example 1 using the prepared latex composition for dip molding, and was likewise evaluated. The results are shown in Table 2.

Comparative Example 2

A latex composition for dip molding having a solids content of 40% by weight and a viscosity at 25° C. of 3,000 mPa·s was prepared in the same manner as in Example 1 except that the latex of a nitril group-containing conjugated diene polymer (A-2) prepared in Production Example 2 was used in place of the latex of a nitrile group-containing conjugated diene polymer (B-1) prepared in Production Example 3. A protective glove (dip-molded article) having a 0.6 mm thick polymer layer was produced in the same manner as in Example 1 using the prepared latex composition for dip molding, and was likewise evaluated. The results are shown in Table 2.

[Table 1]

TABLE 1

|  | Glass transition temperature (° C.) | Weight average particle size (μm) | MEK insolubles content (% by weight) | Degree of swelling in MEK (times) | Young's modulus (MPa) |
| --- | --- | --- | --- | --- | --- |
| Latex of nitrile group-containing conjugated diene polymer (A-1) | −27 | 0.11 | 2.4 | 100 | 0.2 |
| Latex of nitrile group-containing conjugated diene polymer (A-2) | −27 | 0.11 | 1.6 | 130 | 0.1 |
| Latex of nitrile group-containing conjugated diene polymer (B-1) | −27 | 0.11 | 90 | 8 | 1.0 |
| Latex of nitrile group-containing conjugated diene polymer (B-2) | −27 | 0.11 | 62 | 35 | 1.0 |
| Latex of urethane beads (B-3) | −13 | 32 | 85 | 10 | 8 |
| Latex of urethane beads (B-4) | −13 | 6 | 82 | 4 | 6 |
| Latex of vinyl chloride resin (B-5) | 80 | 0.07 | 92 | 2 | 12 |

TABLE 2

|  |  | Example | | | | | | Comparative Example | |
| --- | --- | --- | --- | --- | --- | --- | --- | --- | --- |
|  |  | 1 | 2 | 3 | 4 | 5 | 6 | 1 | 2 |
|  | Components | | | | | | | | |
| Latex of nitrile group-containing conjugated diene polymer A-1)*[1]) (MEK insolubles content: 2.4% by weight, degree of swelling in MEK: 100 times) | (parts) | 70 | 70 | 70 | 70 | 70 |  | 100 | 70 |
| Latex of nitrile group-containing conjugated diene polymer A-2)*[1]) (MEK insolubles content: 1.6% by weight, degree of swelling in MEK: 130 times) | (parts) |  |  |  |  |  | 70 |  | 30 |
| Latex of nitrile group-containing conjugated diene polymer (B-1)*[1]) (MEK insolubles content: 90% by weight, degree of swelling in MEK: 8 times) | (parts) | 30 |  |  |  |  | 30 |  |  |
| Latex of nitrile group-containing conjugated diene polymer (B-2)*[1]) (MEK insolubles content: 55% by weight, degree of swelling in MEK: 35 times) | (parts) |  | 30 |  |  |  |  |  |  |

TABLE 2-continued

|  |  | Example | | | | | | Comparative Example | |
|---|---|---|---|---|---|---|---|---|---|
|  |  | 1 | 2 | 3 | 4 | 5 | 6 | 1 | 2 |
| Latex of urethane beads (B-3)*[1] (MEK insolubles content: 85% by weight, degree of swelling in MEK: 10 times) | (parts) |  |  | 30 |  |  |  |  |  |
| Latest of urethane beads (B-4)*[1] (MEK insolubles content: 82% by weight, degree of swelling in MEK: 4 times) | (parts) |  |  |  | 30 |  |  |  |  |
| Latex of vinyl chloride resin (B-5)*[1] (MEK insolubles content: 92% by weight, degree of swelling in MEK: 2 times) | (parts) |  |  |  |  | 30 |  |  |  |
| Colloidal sulfur | (parts) | 1.0 | 1.0 | 1.0 | 1.0 | 1.0 | 1.0 | 1.0 | 1.0 |
| Zinc dibutyldithiocarbamate | (parts) | 1.0 | 1.0 | 1.0 | 1.0 | 1.0 | 1.0 | 1.0 | 1.0 |
| Zinc oxide | (parts) | 1.5 | 1.5 | 1.5 | 1.5 | 1.5 | 1.5 | 1.5 | 1.5 |
| Titanium oxide | (parts) | 3.0 | 3.0 | 3.0 | 3.0 | 3.0 | 3.0 | 3.0 | 3.0 |
| Carboxymethyl cellulose | (parts) | 0.3 | 0.3 | 0.5 | 0.5 | 1.0 | 0.3 | 0.3 | 0.3 |
| Evaluations of dip-molded article | | | | | | | | | |
| Oil grip properties (maximum weight lifted) | (kg) | 5.0 | 3.0 | 5.0 | 5.0 | 5.0 | 5.0 | 0.0 | 0.0 |
| Young's modulus (flexability) | (kPa) | 200 | 190 | 180 | 170 | 350 | 160 | 180 | 190 |
| Percent permeation of solvent gas (chemical permeation resistance) | (%) | 1.8 | 1.7 | 1.4 | 1.5 | 2.0 | 1.4 | 1.5 | 1.5 |

*[1]Amounts on a solids (polymer components) basis

As shown in Tables 1 and 2, the use of the latex compositions for dip molding prepared by mixing a latex of a conjugated diene polymer (A) having a methyl ethyl ketone insolubles content of 50% by weight or less and a latex of a polymer (B) having a methyl ethyl ketone insolubles content of 55% by weight or more resulted in dip-molded articles having excellent oil grip properties, flexibility, and chemical permeation resistance (Examples 1 to 6).

In contrast, the absence of the latex of a polymer (B) having a methyl ethyl ketone insolubles content of 55% by weight or more resulted in dip-molded articles having poor oil grip properties (Comparative Examples 1 and 2).

REFERENCE SIGNS LIST 10 measurement sample
20 indentation tester
21 measurement table
22 support arm
23 horizontal arm
24 vertical movement mechanism for coarse motion
25 vertical movement mechanism for fine motion
26 stage
27 load cell
28 load shaft
29 spherical indenter
30 suction table

The invention claimed is:

1. A latex composition for dip molding comprising:
   a latex of a conjugated diene polymer (A) having a methyl ethyl ketone insolubles content of 0.1 to 30% by weight; and
   a latex of a polymer (B) having a methyl ethyl ketone insolubles content of 55% by weight or more.

2. The latex composition for dip molding according to claim 1,
   wherein the conjugated diene polymer (A) has a Young's modulus of 0.8 MPa or less, and the polymer (B) has a Young's modulus of 1 MPa or more.

3. The latex composition for dip molding according to claim 1,
   wherein the conjugated diene polymer (A) has a degree of swelling in methyl ethyl ketone of 55 times or more, and the polymer (B) has a degree of swelling in methyl ethyl ketone of 45 times or less.

4. The latex composition for dip molding according to claim 1,
   wherein the conjugated diene polymer (A) is a nitrile group-containing conjugated diene polymer having a methyl ethyl ketone insolubles content of 0.1 to 30% by weight.

5. The latex composition for dip molding according to claim 1,
   wherein the conjugated diene polymer (A) is present in an amount of 40 parts by weight or more in 100 parts by weight of polymer components.

6. The latex composition for dip molding according to claim 1,
   wherein the polymer (B) is a nitrile group-containing conjugated diene polymer having a methyl ethyl ketone insolubles content of 55% by weight or more or a polyurethane resin having a methyl ethyl ketone insolubles content of 55% by weight or more.

7. The latex composition for dip molding according to claim 1, further comprising a sulfur-based cross-linking agent.

8. A dip-molded article formed using the latex composition for dip molding according to claim 1.

9. A dip-molded article formed by soaking a substrate with the latex composition for dip molding according to claim 1.

* * * * *